United States Patent [19]

Loos et al.

[11] Patent Number: 5,377,457
[45] Date of Patent: Jan. 3, 1995

[54] METHOD FOR GENERATING OF GEAR-SHAPED PRECISION-WORKING TOOLS, IN PARTICULAR FOR REGRINDING SHAVING GEARS, AND A GEAR-SHAPED TOOL, IN PARTICULAR A SHAVING GEAR, TO WHICH THE METHOD CAN BE APPLIED

[75] Inventors: Herbert Loos, Dorfen; Manfred Erhardt, Puchheim, both of Germany

[73] Assignee: Hurth Maschinen und Werkzeuge GmbH, Munich, Germany

[21] Appl. No.: 61,864

[22] Filed: May 14, 1993

[30] Foreign Application Priority Data

May 16, 1992 [DE] Germany .................. 4216329

[51] Int. Cl.$^6$ ............................ B24B 53/085
[52] U.S. Cl. ......................... 451/47; 451/48; 407/27; 409/37; 409/49
[58] Field of Search ........... 51/287, 94 CS, 288; 409/37, 49; 407/27

[56] References Cited

U.S. PATENT DOCUMENTS

| | | | |
|---|---|---|---|
| 2,164,642 | 7/1939 | Drader | 51/288 |
| 2,338,061 | 12/1943 | Ross | 51/288 |
| 2,394,469 | 2/1946 | Norton, Jr. | 51/288 |
| 3,180,227 | 4/1965 | Schlichthoerlein | 90/1.6 |
| 4,848,040 | 7/1989 | Nishino | 51/287 |

OTHER PUBLICATIONS

Maschinen-Elemente by G. Niemann and H. Winter Springer-Verlag Berlin, Heidelberg, New York, Tokyo 1983 (2 pages).

*Primary Examiner*—Robert A. Rose
*Attorney, Agent, or Firm*—Flynn, Thiel, Boutell & Tanis

[57] ABSTRACT

Gear-shaped precision-working tools, in particular shaving gears, capable of providing an optimum machining result only during a portion of their entire lifetime, since during each regrinding (generating), the profile displacement factor, and thus the number of the tooth flanks which engage successively and simultaneously one after the other the workpiece gear to be machined, is changed. This is remedied with the invention in such a manner that the precision-working tool is reground (generated) while maintaining the original number of teeth ($z$) and the original normal module of the pitch angle ($\beta$), the module in transverse section and the base circle diameter are changed in such a manner that little or no change occurs to an original profile displacement factor ($x$). When the tool, which is to be reground (to be generated) in this manner, has grooved tooth flanks (12, 13), for grooves (14) increases continuously from a first groove (14') mutually adjacent one end of a tooth flank (12, 13) up to a second groove (14") mutually adjacent an other end of the same tooth flank, the grooves (14") having the greatest depth and the grooves (14') having the least on mutually adjacent and opposing tooth flanks (12, 13) opposing one another.

4 Claims, 1 Drawing Sheet

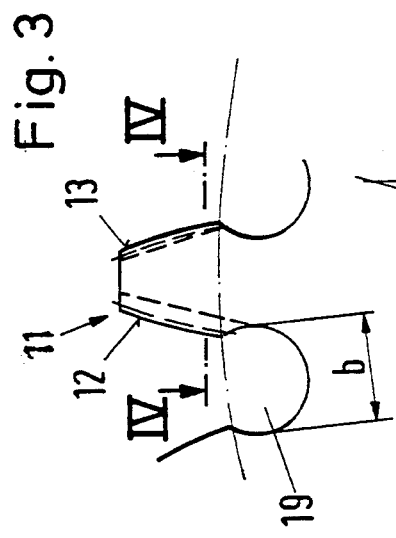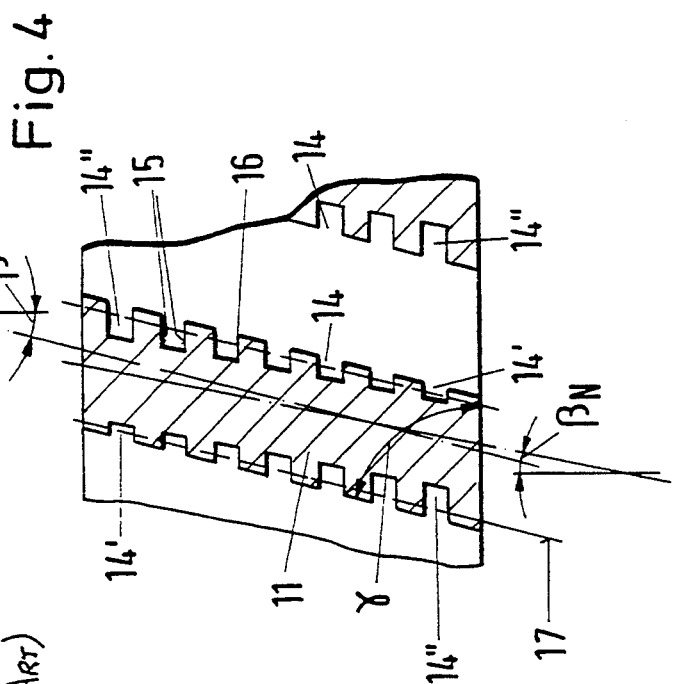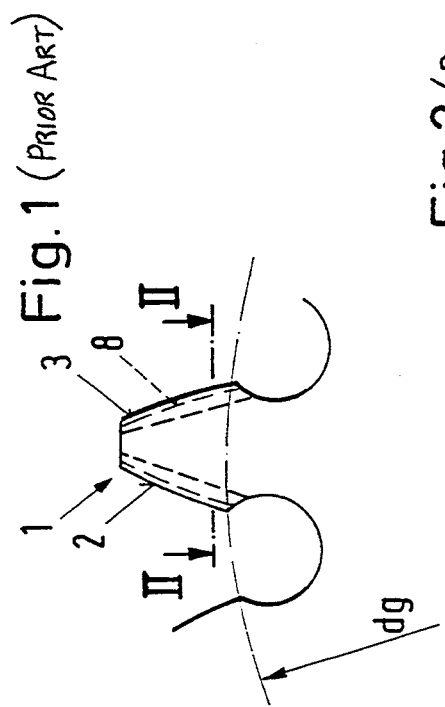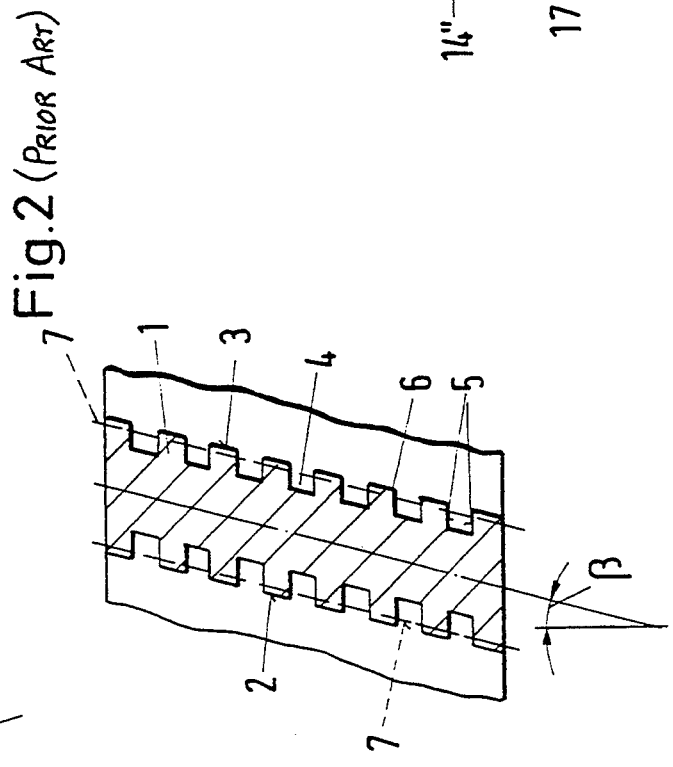

METHOD FOR GENERATING OF GEAR-SHAPED PRECISION-WORKING TOOLS, IN PARTICULAR FOR REGRINDING SHAVING GEARS, AND A GEAR-SHAPED TOOL, IN PARTICULAR A SHAVING GEAR, TO WHICH THE METHOD CAN BE APPLIED

FIELD OF THE INVENTION

The invention relates to a method for generating of gear-shaped precision-working tools and a gear-shaped tool to which the method can be applied. Even though the invention relates mainly to shaving gears, it can be applied also to other gear-shaped precision-working tools. Since these tools can also be finished, reworked, dressed, etc. through other methods than grinding, the term "generating" instead of "regrinding" will herinafter often be used.

BACKGROUND OF THE INVENTION

Gear-shaped precision-working tools which have geometrically defined cutting edges on their tooth flanks have been known for a long time and are generally identified as shaving gears. Gear-shaped precision-working tools identified as honing cutters, hard shaving cutters or the like are also known, the flanks of which have an abrasive surface.

It is known from DE-PS 970 027 (corresponds to U.S. Pat. No. 3,180,227) to select, in order to achieve an optimum shaving result, the dimensions (module, pressure angle, number of teeth, profile displacement factor, pitch angle, tooth addendum height) of a shaving gear in such a manner that, within the paths of contact or lengths of action with the workpiece, an even number of tooth flanks always successively and simultaneously engage one after the other and that the pitch point divides the lengths of action at the transition point between two path lengths corresponding with such states of contact.

A shaving gear is reground during its lifetime, depending on its use, approximately 10 to 15 times, with at least 0.03 mm being removed from each tooth flank or, in the case of significant wear, even up to 0.1 mm is removed. Since the original pitch angle is maintained during the regrinding, the profile displacement factor changes toward a negative. This profile displacement factor, which changes continuously during the lifetime of the shaving gear, has the result that the "state of symmetry" known from DE-PS 970 027 is, as a rule, only achieved during a grinding state of the shaving gear. In practice one proceeds in designing a shaving gear in such a manner that it lies above the state of symmetry when it is new, thus does not yet achieve an optimum shaving result, but achieves an optimum shaving result only once it has been reground several times; however, the shaving result worsens with each further regrinding until the worn or used-up state of the shaving gear has been reached.

SUMMARY OF THE INVENTION

To overcome this disadvantage, the basic purpose of the invention is to provide a method for generating gear-shaped precision-working tools, in particular for the regrinding of shaving gears which enables an optimum machining result in every (first time or repeated) generated state of the tool. In addition, the invention is to provide a shaving gear or an abrasive precision-working tool, the flanks of which are grooved, which can be generated according to the method.

Contrary to the present practice, the pitch angle is changed during each repeated generating in such a manner that little or no change occurs to a profile displacement factor determined when designing the tooth system of the precision-working tool. This does have the consequence that the machine adjustment must be changed when a subsequently generated tool is used, however, this can be easily accepted in view of the good machining result which remains constant over the entire lifetime of the tool.

BRIEF DESCRIPTION OF THE DRAWINGS

The invention will be described hereinafter in connection with one exemplary embodiment illustrated in the four figures, in which:

FIG. 1 illustrates a tooth of a conventional shaving gear;

FIG. 2 is a sectional view taken along the line II—II of FIG. 1;

FIG. 3 illustrates a tooth of a shaving gear embodying the invention; and

FIG. 4 is a sectional view taken along the line IV—IV of FIG. 3.

DETAILED DESCRIPTION

As shown in FIGS. 1 and 2, the tooth flanks 2, 3 are each provided with plural grooves 4 and at the transition between the groove walls 5 and the remaining flank sections cutting edges 6 are defined. When the cutting edges 6 have become dull after working a number of workpieces, the shaving gear must be reground. Material is thereby removed from the tooth flanks 2, 3 approximately up to the dashed line 7, which represents a possible reground state, by a rotating grinding disk. FIG. 1 shows the reground tooth with the dashed profile 8, which compared with the original profile has a negative profile displacement factor. A regrinding of the tooth flanks 2, 3 is possible as often as the grooves 4 have a sufficient depth for effecting a cutting and allowing a sufficient cooling-medium throughput and chip removal. Since the pitch angle $\beta$ and the remaining relevant tooth system date (number of teeth z, module m, base circle diameter $d_g$), were not changed during regrinding, different engagement relationships, in regard to the same workpiece, result after the regrinding, which also changes the number of tooth flanks which successively and simultaneously engage one after the other during generating. Depending on the occurred design and achieved regrinding set, this results in a change to the good or a change to the bad in the machining result. A good machining result achieved prior to the regrind is as a rule not achieved.

FIGS. 3 and 4 show a tooth 11 of a shaving gear according to the invention. The tooth flanks 12, 13 are each provided with plural, radially extending, grooves 14 and at the transition between the groove walls 15 and the remaining flank sections cutting edges 16 are defined. When the cutting edges 16 have become dull after working a number of workpieces, the shaving gear must be reground. Again material is removed from the tooth flanks 12, 13 to approximately the dashed line 17 by a rotating grinding disk, which dashed line 17 illustrates a possible reground state and, in contrast to the earlier mentioned line 7, does not extend parallel to the tooth flanks 12, 13, but instead extends at a new pitch angle $\beta_N$. This new pitch angle $\beta_N$ is chosen such that, while maintaining the present tooth count and the present normal module $m_n$ and while changing the present module in transverse section $m_s$ and the base-circle diameter $d_g$, an earlier existing profile displacement factor x does not change or only changes insignificantly. Thus, it is possible to achieve an optimum machining result with a shaving gear designed according to the above-mentioned teaching during the entire lifetime of the shaving gear, thus also after each regrind which is, from time to time, necessary. A regrinding of the tooth flanks 12, 13 is here also possible as long as the grooves 14 continue to have a sufficient depth and, in view of the respectively changed pitch angle $\beta$, there also remains a sufficient width b of the gap 19 at the base of the tooth. Each new pitch angle $\beta_N$ causes an uneven material removal from the flanks. The depth of the grooves 14 therefor changes over the tooth width in such a manner that the depth continuously increases from a first groove 14' adjacent one axially facing side to a last groove 14" adjacent the other axially facing side. In the case of oppositely facing tooth flanks 12, 13, the grooves with the greatest depth and the grooves with the least depth oppose one another. The groove 14" with the greatest depth must, in the case of helically toothed shaving gears, each be provided at the end of the tooth flank 12 which forms with the mutually adjacent axially facing side an acute lead angle $\gamma$. It is possible in this manner to slightly reduce the pitch angle during each regrind by removing more material at the flank ends having the deeper grooves 14" than at the ends having the more shallow grooves 14'.

The following profile displacement factors x resulted from an actual use of the "state of symmetry" design for various pitch angles $\beta$:

| $\beta, \beta_N$ | x |
|---|---|
| 17° | −0.5781 |
| 15° | −0.5739 |
| 13° | −0.5703 |

From this it can be seen that the profile displacement factor can be kept almost constant (i.e., the changes thereto are insignificant) with small changes to the pitch angle $\beta$.

The basic principle of the invention can easily be also applied to solid slotted shaving gears and to disklike shaving gears without necessitating structural modification. It is also possible to apply the invention to normal honing gears and other like tools without requiring the material removal during generating to be done by a grinding disk; dressing tools or the like embedded with diamonds can here also be used. Of importance is only that the gap 19 at the base of the tooth have a width b permitting the change of the angle.

Of course the invention can also be applied to all gear-shaped tools having an internal tooth system.

The embodiments of the invention in which an exclusive property or privilege is claimed are defined as follows:

1. In a method for generating of a gear-shaped precision-working tool having tooth flanks thereon and in which material is removed from the tooth flanks by means of a tool and to thereby change a tooth flank geometry, the improvement comprising the step of changing a pitch angle ($\beta$), a module in transverse section ($m_s$) and a base circle diameter ($d_g$) in such a manner that an insignificant change is made to an originally existing profile displacement fact (x).

2. IN a gear-shaped precision-working tool having plural teeth with circumferentially facing tooth flanks, each with plural radially extending grooves which divide the tool flanks into protruding flank parts and receding flank parts each in the form of a base of a groove, which in case of wear can be reground, the improvement wherein the depth of the individual grooves increases continuously from a first groove mutually adjacent one end of a tooth flank up to a second groove mutually adjacent an other end of the same tooth flank, the grooves with the greatest depth and the grooves with the least depth on mutually adjacent and opposing tooth flanks opposing one another.

3. The gear-shaped precision-working tool according to claim 2, wherein a pitch angle $\beta > 0°$, wherein the grooves having the greatest depth are arranged adjacent the end of the tooth flanks whereat an acute angle between a plane containing an axial face of the tool and a tooth flank.

4. The method according to claim 1, wherein the gear-shaped precision-working tool is a shaving gear.

* * * * *

UNITED STATES PATENT AND TRADEMARK OFFICE
CERTIFICATE OF CORRECTION

PATENT NO. : 5 377 457
DATED : January 3, 1995
INVENTOR(S) : Herbert LOOS et al

It is certified that error appears in the above-indentified patent and that said Letters Patent is hereby corrected as shown below:

Column 4, line 28; change "tool" to ---tooth---.

Signed and Sealed this

Fourth Day of July, 1995

Attest:

BRUCE LEHMAN

Attesting Officer     Commissioner of Patents and Trademarks